United States Patent
Cho

(10) Patent No.: US 10,199,616 B2
(45) Date of Patent: Feb. 5, 2019

(54) BATTERY PACK INCLUDING CELL FRAMES COUPLED TO EACH OTHER

(71) Applicant: SAMSUNG SDI CO., LTD., Yongin-si, Gyeonggi-do (KR)

(72) Inventor: Susang Cho, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 532 days.

(21) Appl. No.: 14/704,171

(22) Filed: May 5, 2015

(65) Prior Publication Data

US 2016/0211492 A1 Jul. 21, 2016

(30) Foreign Application Priority Data

Jan. 19, 2015 (KR) .................. 10-2015-0008673

(51) Int. Cl.
*H01M 6/42* (2006.01)
*H01M 2/10* (2006.01)
*H01M 10/0525* (2010.01)

(52) U.S. Cl.
CPC ...... *H01M 2/1016* (2013.01); *H01M 10/0525* (2013.01)

(58) Field of Classification Search
CPC ............. H01M 2/1016; H01M 2/1072; H01M 2/1077; H01M 2/1061; H01M 10/0525; H01M 10/052
See application file for complete search history.

(56) References Cited

U.S. PATENT DOCUMENTS

2004/0070366 A1* 4/2004 Takeshita ............ H01M 2/1061 320/107
2009/0317703 A1 12/2009 Kwag et al.

FOREIGN PATENT DOCUMENTS

| JP | 2003086158 A | 3/2003 |
| JP | 2005-005008 | 1/2005 |
| JP | 20090132490 A | 12/2009 |
| JP | 2014-017141 | 1/2014 |

* cited by examiner

*Primary Examiner* — Raymond Alejandro
(74) *Attorney, Agent, or Firm* — Lee & Morse, P.C.

(57) ABSTRACT

A battery pack includes a plurality of battery cells, each battery cell of the plurality of battery cells including a top surface from which a pair of electrode tabs are drawn, a bottom surface facing the top surface, and a pair of long side surfaces having relatively large areas and a pair of short side surfaces having relatively small areas, among surfaces connecting the top surface and the bottom surface, and a plurality of cell frames, each cell frame of the plurality of cell frames individually accommodating a respective one of the battery cells and exposing portions of the long side surfaces of the respective one of the battery cells. The cell frames are coupled to each other in a line. Edges of the cell frames include fixing parts extending parallel with the long side surfaces of the battery cells and covering portions of the long side surfaces.

9 Claims, 7 Drawing Sheets

BATTERY PACK INCLUDING CELL FRAMES COUPLED TO EACH OTHER

CROSS-REFERENCE TO RELATED APPLICATION

Korean Patent Application No. 10-2015-0008673, filed on Jan. 19, 2015, in the Korean Intellectual Property Office, and entitled: "Battery Pack," is incorporated by reference herein in its entirety.

BACKGROUND

1. Field

Embodiments relate to a battery pack.

2. Description of the Related Art

Unlike primary batteries, secondary batteries are rechargeable. Of these secondary batteries, a low capacity battery including a battery cell in the form of a pack may be used in small portable electronic devices such as cellular phones and camcorders, while a high capacity battery including tens of battery cells connected to one another may be used as a power source for driving a motor, e.g., for hybrid vehicles.

Secondary batteries are manufactured in various shapes, such as a cylindrical shape, a prismatic shape or a pouch-like shape. An example secondary battery may be constructed as follows. An electrolyte and an electrode assembly formed by interposing a separator as an insulator between a positive electrode plate and a negative electrode plate are accommodated in a battery case, and a cap plate is then installed on the battery case. The electrode assembly is connected with a positive terminal and a negative terminal, which protrude through the cap plate and are exposed to the outside of the electrode assembly.

SUMMARY

Embodiments are directed to a battery pack including a plurality of battery cells, each battery cell of the plurality of battery cells including a top surface from which a pair of electrode tabs are drawn, a bottom surface facing the top surface, and a pair of long side surfaces having relatively large areas and a pair of short side surfaces having relatively small areas, among surfaces connecting the top surface and the bottom surface, and a plurality of cell frames, each cell frame of the plurality of cell frames individually accommodating a respective one of the battery cells and exposing at least portions of the long side surfaces of the respective one of the battery cells. The cell frames are coupled to each other in a line. Edges of the cell frames include one or more fixing parts extending parallel with the long side surfaces of the battery cells and covering portions of the long side surfaces.

The fixing parts may extend from portions of the edges of the cell frames.

The fixing parts may extend along an entirety of the edges of the cell frames.

Long side surfaces of the battery cells facing first sides of the cell frames may be wholly exposed by the cell frames. Long side surfaces of the battery cells facing second sides of the cell frames may be partially exposed and may be partially covered by the fixing parts.

The fixing parts may be located between each of the battery cells. The fixing parts may separate the battery cells from each other.

A width of each of surfaces of each cell frame may be greater than a width of each of the short side surfaces of each battery cell.

Each cell frame may further include one or more air holes in a form of a partial cut in an edge of the cell frame, the air holes exposing a portion of a respective one of the battery cells.

Each cell frame may include one or more coupling grooves and one or more coupling protrusions corresponding to the coupling grooves that engage the cell frames with each other.

One surface of each cell frame may include a first coupling groove in a form of a cut from a first end of the one surface, a coupling protrusion protruding from a second end of the one surface, the coupling protrusion being positioned at a same height as the first coupling groove, and a second coupling groove in a form of a cut from the second end, the second coupling groove being positioned under the coupling protrusion. Another surface facing the one surface of each cell frame may include a first end and a second end, the another surface including a first coupling groove in a form of a cut from the second end of the another surface, a coupling protrusion protruding from the second end, the coupling protrusion being positioned under the first coupling groove, and a second coupling groove in a form of a cut from a first end of the another surface, the second coupling groove being positioned at a same height as the coupling protrusion.

The first coupling groove and the coupling protrusion located on the one surface of each cell frame may be positioned at a same height as the first coupling groove located on the another surface of each cell frame. The second coupling groove located on the one surface of each cell frame may be positioned at the same height as the second coupling groove and the coupling protrusion located on the another surface of each cell frame.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
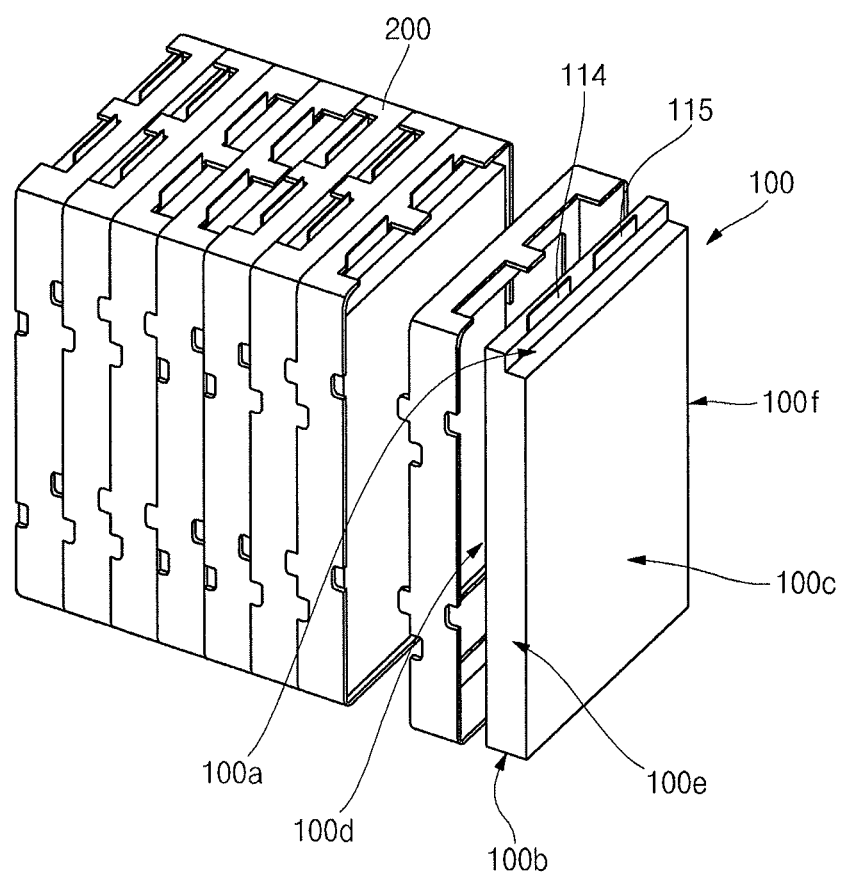
FIG. 1 illustrates a partially exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
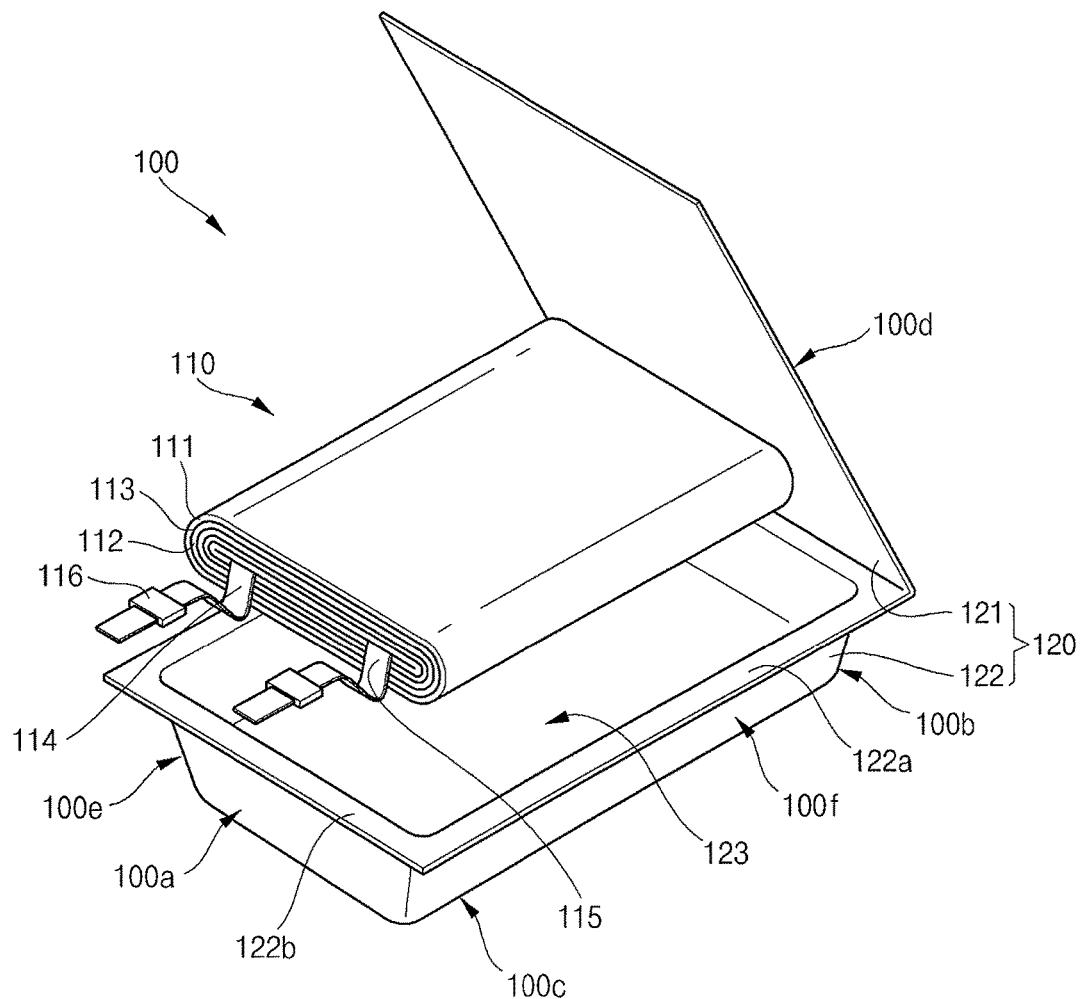
FIG. 2 illustrates an exploded perspective view depicting a battery cell in the battery pack shown in FIG. 1.
Figure 3:
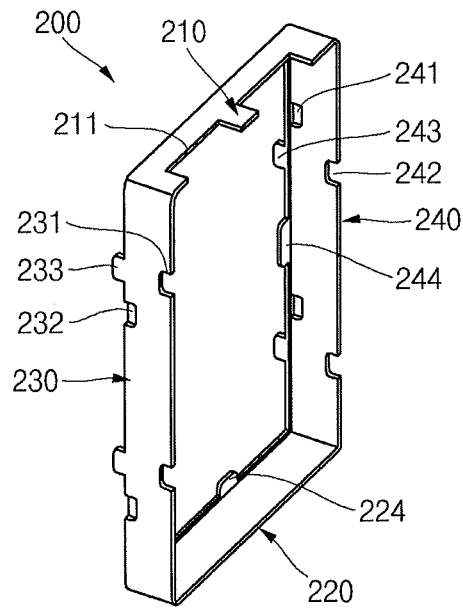
FIG. 3 illustrates a perspective view of a cell frame in the battery pack shown in FIG. 1.
Figure 4:
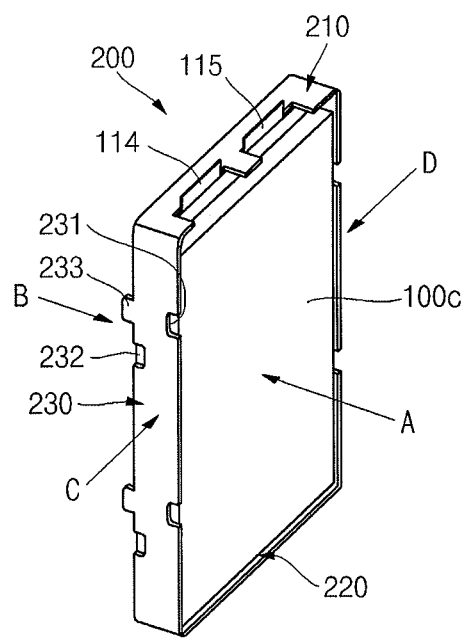
FIG. 4 illustrates a perspective view depicting a state in which a cell frame and a battery cell are assembled with each other in the battery pack shown in FIG. 1.
Figure 5A:
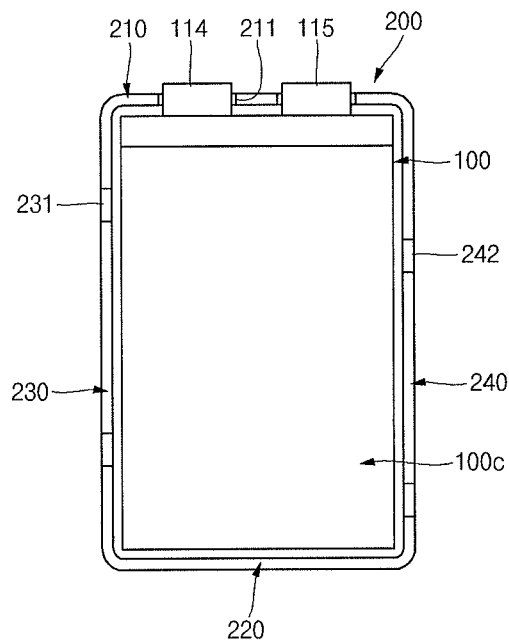
FIGS. 5A to 5D illustrate front views as viewed from directions A, B, C and D (see FIG. 4)
Figure 5B:
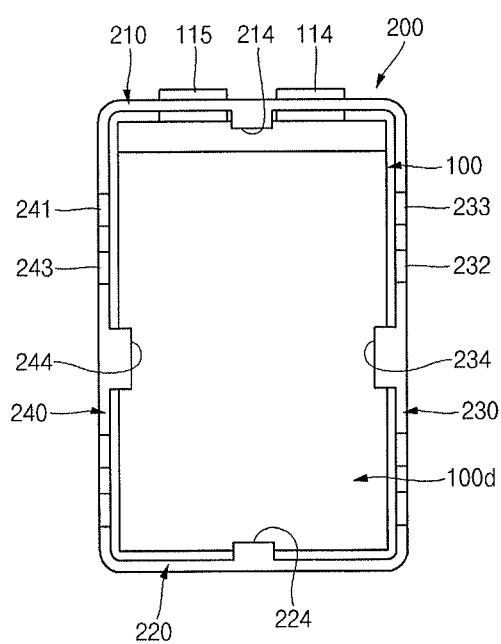
Figure 5C:
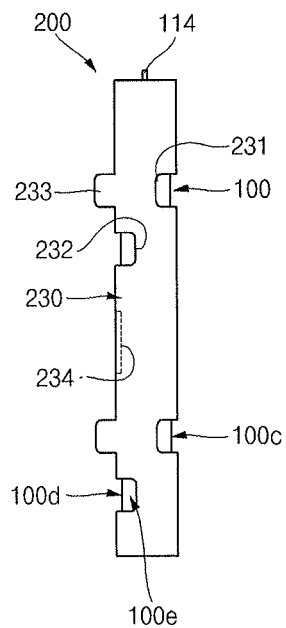
Figure 5D:
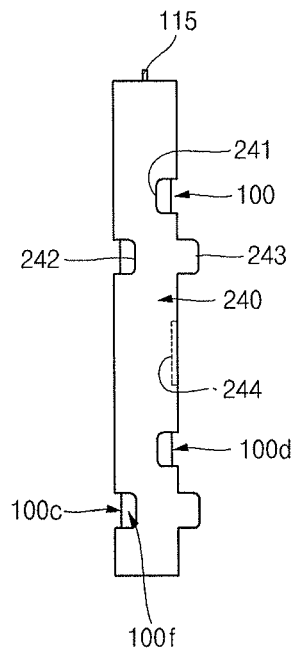
Figure 6:
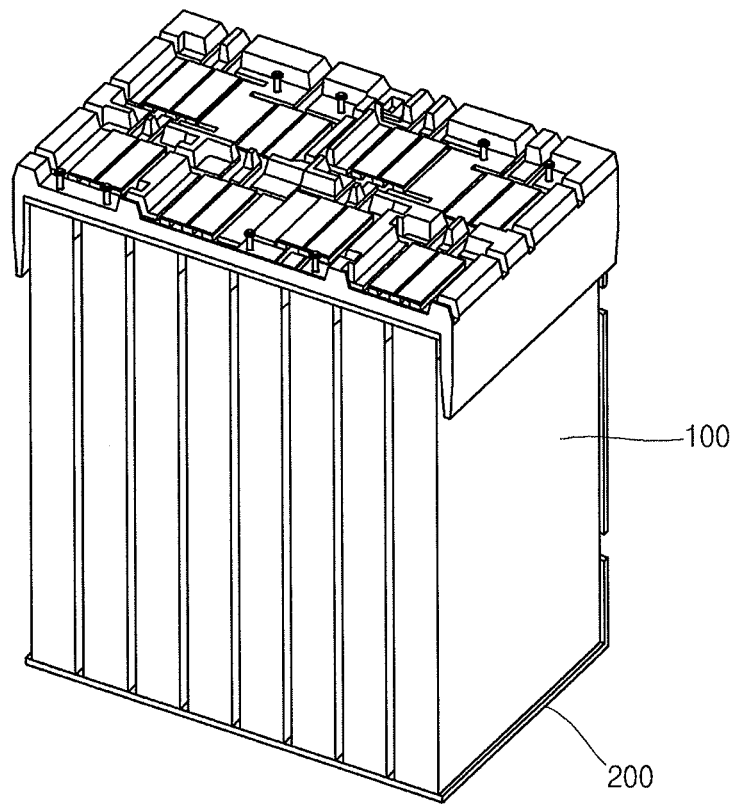
FIG. 6 illustrates a perspective view depicting the battery pack shown in FIG. 1 with one surface of the cell frames omitted for clarity of illustration.

FIG. 1 illustrates a partially exploded perspective view of a battery pack according to an embodiment, FIG. 2 illustrates an exploded perspective view depicting a battery cell in the battery pack shown in FIG. 1, FIG. 3 illustrates a perspective view of a cell frame in the battery pack shown in FIG. 1, FIG. 4 illustrates a perspective view depicting a state in which a cell frame and a battery cell are assembled with each other in the battery pack shown in FIG. 1, FIGS. 5A to 5D illustrate front views as viewed from directions A, B, C and D, as shown in FIG. 4, and FIG. 6 illustrates a perspective view depicting the battery pack shown in FIG. 1 with one surface of the cell frames omitted for clarity.

Referring to FIGS. 1 to 6, the battery pack according to an embodiment includes one or more battery cells 100 and one or more cell frames 200 individually wrapping the battery cells 100.

The battery cell 100 may include an electrode assembly 110 and a case 120 accommodating electrode assembly 110. The battery cell 100 of a pouch type is illustrated, as an example. In some implementations, the battery cell may be a prismatic battery.

The electrode assembly 110 may be formed by winding or stacking a first electrode plate 111, a separator 113, and a second electrode plate 112. The first electrode plate 111 may function as a positive electrode and the second electrode plate 112 may function as a negative electrode, or vice versa.

When the first electrode plate 111 is a positive electrode, the first electrode plate 111 may be formed by coating a first active material on both surfaces of a first current collector formed of a highly conductive metal foil, e.g., an aluminum (Al) foil. The first active material may include a chalcogenide compound. Examples thereof may include composite metal oxides, such as $LiCoO_2$, $LiMn_2O_4$, $LiNiO_2$, or $LiNiMnO_2$.

A first electrode tab 114 may be formed on a first electrode uncoated portion on which the first active material of the first electrode plate 111 is not coated. One end of the first electrode tab 114 may be electrically connected to the first electrode uncoated portion and the other end of the first electrode tab 114 may be drawn to the outside of the case 120. In addition, an insulating tape 116 may be attached to a region of the first electrode tab 114 making contact with the case 120. The insulating tape 116 may be made of polyphenylene sulfide (PS), polyimide (PI), and/or polypropylene (PP), as examples.

When the second electrode plate 112 is a negative electrode, the second electrode plate 112 is formed by coating a second active material on both surfaces of a second current collector formed of a highly conductive metal foil, e.g., a copper (Cu) or nickel (Ni) foil. The second active material may include a carbon-series material, Si, Sn, tin oxide, a tin alloy compound, a transition metal oxide, lithium metal nitride or a metal oxide, as examples.

A second electrode tab 115 may be formed on a second electrode uncoated portion of the second current collector on which the second active material is not coated. One end of the second electrode tab 115 may be electrically connected to the second electrode uncoated portion and the other end of the second electrode tab 115 may be drawn to the outside of the case 120. In addition, the insulating tape 116 may also be attached to a region of the second electrode tab 115 making contact with the case 120.

The separator 113 may be disposed between the first electrode plate 111 and the second electrode plate 112 to prevent a short circuit from occurring between the first electrode plate 111 and the second electrode plate 112. The separator 113 may be formed of polyethylene, polypropylene, or a copolymer of polypropylene and polyethylene, as examples.

The separator 113 may be formed to have a greater width than the first and second electrode plates 111 and 112 to prevent a short circuit from occurring between the first and second electrode plates 111 and 112.

The case 120 may include an upper case 121 and a lower case 122 formed by folding a central portion of one side of an rectangular pouch film formed in a single body. In addition, a groove 123 for accommodating the electrode assembly 110 may be formed in the lower case 122 by, for example, pressing. A side surface sealing portion 122a and a top surface sealing portion 122b for sealing the upper case 121 may be formed in the lower case 122 along three sides of the groove 123, except for one side integrally contacting the upper case 121.

After the electrode assembly 110 is accommodated in the groove 123 of the lower case 122, in a state in which the lower case 122 is brought into close contact with the upper case 121, the side surface sealing portion 122a and the top surface sealing portion 122b may be thermally fused to seal the case 120. In addition, the side surface sealing portion 122a, except for the top surface sealing portion 122b from which the first and second electrode tabs 114 and 115 of the battery cell 100 protrude, may be folded toward lateral surfaces of the lower case 122.

The battery cell 100 may include a top surface 100a from which the first and second electrode tabs 114 and 115 are drawn, a bottom surface 100b facing the top surface 100a, and a pair of first and second long side surfaces 100c and 100d having relative large areas and a pair of first and second short side surfaces 100e and 100f having relative small areas, among surfaces connecting the top surface 100a and the bottom surface 100b.

The cell frame 200 may be formed to wrap the top surface 100a, the bottom surface 100b, the first short side surface 100e and the second short side surface 100f of the battery cell 100. In addition, the cell frame 200 may have open first and second sides corresponding to the first and second long side surfaces 100c and 100d of the battery cell 100. In a state in which the first and second long side surfaces 100c and 100d are exposed in the open first and second sides of the cell frame 200, the battery cell 100 may be accommodated in the cell frame 200. The cell frame 200 may include a first surface 210, a second surface 220, a third surface 230 and a fourth surface 240 covering the top surface 100a, the bottom surface 100b, the first short side surface 100e and the second short side surface 100f of the battery cell 100, respectively. In the following description, for the sake of brevity and convenient explanation, in FIG. 4, a region corresponding to the first long side surface 100c of the battery cell 100 is referred to as a first side, and a region corresponding to the second long side surface 100d of the battery cell 100 is referred to as a second side.

The first surface 210 of the cell frame 200 may cover the top surface 100a of the battery cell 100. The first surface 210 may include a pair of electrode tab holes 211 to allow the first and second electrode tabs 114 and 115 drawn from the top surface 100a to pass therethrough. The pair of electrode tab holes 211 may be formed at positions corresponding to the first and second electrode tabs 114 and 115 to be spaced apart from each other. The first and second electrode tabs 114 and 115 may be spaced apart from each other by the electrode tab holes 211 to be electrically insulated. The first and second electrode tabs 114 and 115 may be guided by the electrode tab holes 211 to be position-fixed, thereby improving structural stability. The electrode tab holes 211 may be formed by cutting the first surface 210 from one end by a predetermined depth. Some regions of the top surface 100a of the battery cell 100 may be exposed by the electrode tab holes 211. The first and second electrode tabs 114 and 115 may be inserted from the open first sides of the electrode tab holes 211 to then be positioned in the electrode tab holes 211.

The second surface 220 of the cell frame 200 may face and be parallel with the first surface 210 and may cover the bottom surface 100b of the battery cell 100.

The third surface 230 of the cell frame 200 may be perpendicular to the first surface 210 and the second surface 220 and may cover the first short side surface 100e of the battery cell 100. The third surface 230 includes a pair of first coupling grooves 231, a pair of second coupling grooves 232 and a pair of coupling protrusions 233. The first coupling grooves 231 may be formed by cutting the third surface 230 from the first end toward the second end of the third surface 230. The coupling protrusions 233 may be formed to protrude from the second end of the third surface 230 at the same height as the first coupling grooves 231. The second coupling grooves 232 may be formed under the coupling protrusions 233 by cutting the third surface 230 from the second end toward the first end of the third surface 230. The first coupling grooves 231, the coupling protrusions 233 and the second coupling grooves 232 may be provided in pairs at top and bottom portions of the third surface 230.

The fourth surface 240 of the cell frame 200 may be perpendicular to the first surface 210 and the second surface 220 and may cover the second short side surface 100f of the battery cell 100. The fourth surface 240 may include a pair of first coupling grooves 241, a pair of second coupling grooves 242 and a pair of coupling protrusions 243. The first coupling grooves 241 may be formed by cutting the fourth surface 240 from the second end toward the first end of the fourth surface 240. The coupling protrusions 243 may be formed under the first coupling grooves 241 to protrude from the second end toward the first end of the fourth surface 240. Further, the second coupling grooves 242 are formed by cutting the fourth surface 240 from the first end toward the second end of the fourth surface 240 at the same heights as the coupling protrusions 243. The first coupling grooves 241 may be positioned at the same heights as the first coupling grooves 231 and the coupling protrusions 233 of the third surface 230. The coupling protrusion 243 and the second coupling grooves 242 may be positioned at the same heights as the second coupling grooves 232 of the third surface 230. The first coupling grooves 241, the coupling protrusion 243 and the second coupling grooves 242 may be provided in pairs at top and bottom portions of the fourth surface 240.

The battery pack may include a plurality of battery cells 100 and cell frames 200. The battery cells 100 may be individually mounted in respective ones of the cell frames 200. When the cell frames 200 are combined with each other such that third surfaces 230 of the cell frames 200 are positioned in the same direction, the coupling protrusions 233 of the third surface 230 of a pertinent cell frame 200 may be inserted into the first coupling grooves 231 formed in the third surface 230 of the cell frame 200 adjacent to the pertinent cell frame 200. In addition, when the cell frames 200 are combined with each other such that the fourth surfaces 240 of the cell frames 200 are positioned in the same direction, the coupling protrusions 243 of the fourth surface 240 of the pertinent cell frame 200 may be inserted into the second coupling grooves 242 formed in the fourth surface 240 of the cell frame 200 adjacent to the pertinent cell frame 200. If the cell frames 200 are combined with each other such that the third surfaces 230 and the fourth surfaces 240 are alternately positioned to face the same direction, the coupling protrusions 233 of the third surface 230 of the pertinent cell frame 200 may be inserted into the first coupling grooves 241 of the fourth surface 240 of the cell frame 200 adjacent to the pertinent cell frame 200. In addition, the coupling protrusions 243 of the fourth surface 240 of the pertinent cell frame 200 may be inserted into the second coupling grooves 232 of the third surface 230 of the cell frame 200 adjacent to the pertinent cell frame 200. The coupling grooves and coupling protrusions may be engaged with each other in an interference fit manner, as an example.

In the battery pack according to the present embodiment, the cell frames 200 may be combined with each other by positioning the third surfaces 230 and the fourth surfaces 240 to be arranged in the same direction. In other implementations, the cell frames 200 may be combined with each other by positioning the third surfaces 230 and the fourth surfaces 240 to be alternately aligned in the same direction. Series or parallel connections of the battery cells 100 mounted in the cell frames 200 may be freely performed according to the engagement method of the cell frames 200.

Positions of the first long side surface 100c and the second long side surface 100d of the battery cell 100 may vary with respect to the open first and second sides of the cell frames 200. Even if the third surfaces 230 or the fourth surfaces 240 of the cell frames 200 are all aligned in one direction, the battery cells 100 may be positioned in the cell frames 200 such that the first and second electrode tabs 114 and 115 are alternately aligned, thereby freely performing series or parallel connections of the battery cells 100.

Fixing parts 214, 224, 234, and 244 for fixing the battery cells 100 on the cell frames 200 may be formed in the first, second, third and fourth surfaces 210, 220, 230, and 240 of each of the cell frames 200 so as to help prevent separation of the battery cells 100 from the cell frames 200. The fixing parts 214, 224, 234, and 244 may extend from second ends of the first, second, third and fourth surfaces 210, 220, 230, and 240 to be parallel with the long side surfaces 100c and 100d of the battery cells 100. The fixing parts 214, 224, 234, and 244 may be formed at central portions of the first, second, third and fourth surfaces 210, 220, 230, and 240, respectively.

The battery cells 100 may be spaced a predetermined distance apart from each other by the fixing parts 214, 224, 234, and 244. The fixing parts 214, 224, 234, and 244 may be disposed between the battery cells 100 such that the battery cells 100 are spaced apart from each other. Referring to FIG. 5B, empty spaces in which the fixing parts 214, 224, 234, and 244 are not formed (that is, regions where long side surfaces of the battery cells 100 are exposed) may be formed at the second sides of the cell frames 200, thereby securing spaces between the battery cells 100.

In addition, widths of the first, second, third and fourth surfaces 210, 220, 230, and 240 of each of the cell frames 200 may be slightly greater than widths of the top surface 100a of the battery cell 100, the bottom surface 100b, the first short side surface 100e and the second short side surface 100f. In particular, referring to FIGS. 5C and 5D, first sides of the first, second, third and fourth surfaces 210, 220, 230, and 240 may protrude slightly relative to the first sides of the battery cells 100. Even if the cell frames 200 are combined with each other such that the first sides of the cell frames 200, where the fixing parts 214, 224, 234, and 244 are not formed, are positioned to be adjacent to each other, the battery cells 100 may be positioned to be spaced apart from each other in a state in which spaces exist therebetween.

As illustrated in FIG. 6 (with one surface of the cell frames omitted for clarity of illustration), the battery cells 100 may be positioned to be spaced a predetermined distance apart from each other by the cell frames 200. Spaces for swelling of the battery cells 100 during use of the battery pack may be secured. Even if the battery cells 100 swell, the spaces between the battery cells 100 may allow the overall external appearance of the battery pack to be maintained. In addition, attaching a separate tape to portions between the battery cells 100 for the purpose of securing swelling spaces may be omitted. Accordingly, the overall manufacturing process may be simplified, attachment failures may be avoided and material costs may be be saved. Further, the battery cells 100 may be individually wrapped by the cell frames 200. Accordingly, it may be possible to protect the battery cells 100 from external shocks.

Figure 7A:
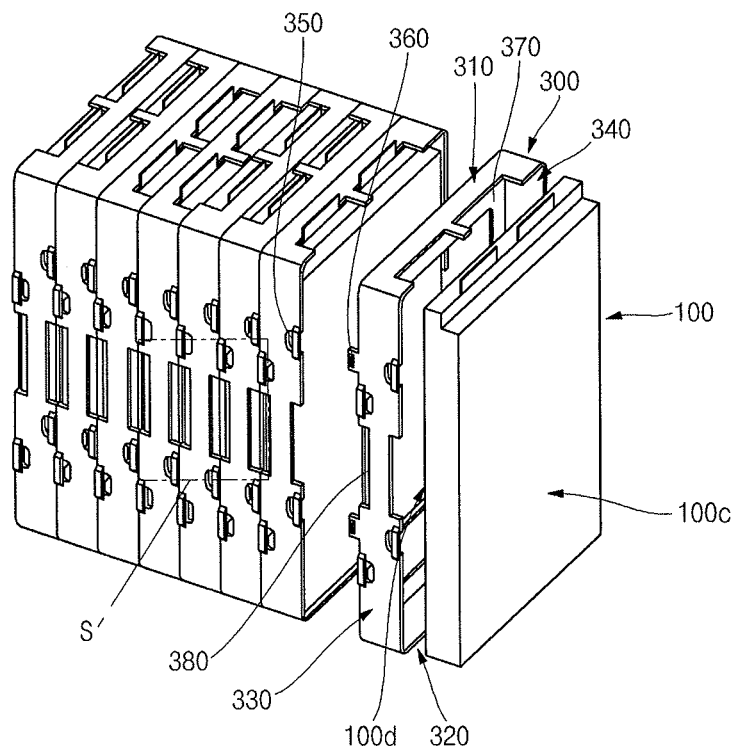
FIG. 7A illustrates a partially exploded perspective view of a battery pack according to another embodiment.
Figure 7B:
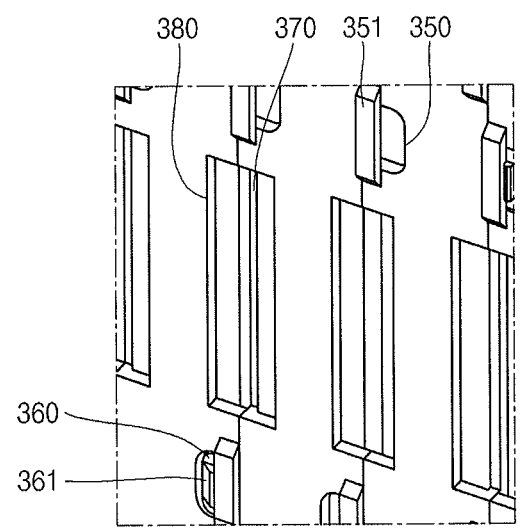
FIG. 7B illustrates an enlarged view illustrating a portion S of FIG. 7A.

FIG. 7A illustrates a perspective view of a battery pack according to another embodiment, and FIG. 7B illustrates an enlarged view illustrating a portion S of FIG. 7A. Here, the same functional components as those of the previous embodiment are denoted by the same reference numerals, and the following description will focus on differences between the previous and present embodiments.

Referring to FIGS. 7A and 7B, the battery pack according to another embodiment includes one or more battery cells 100 and one or more cell frames 300 individually wrapping the battery cells 100. Here, since positions and functions of coupling grooves and coupling protrusions of the cell frames 300 are the same as those of the previous embodiment, explanations thereof will not be repeated. In addition, for the sake of brevity and convenient explanation, a region corresponding to the first long side surface 100c of the battery cell 100 is referred to as a first side, and a region corresponding to a second long side surface 100d of the battery cell 100 is referred to as a second side.

Each of the cell frames 300 may have a first surface 310, a second surface 320, a third surface 330 and a fourth surface 340. A plurality of coupling protrusions 360 may combine the cell frames 300 with each other in the third surface 330 and the fourth surface 340. The cell frames 300 may include fixing parts 370 extending from second ends of the first, second, third and fourth surfaces 310, 320, 330 and 340 and covering some portions of long side surfaces of the battery cells 100. In addition, a pair of air holes 380 cut from the first and second ends of the third and fourth surfaces 330 and 340 may be formed in the third and fourth surfaces 330 and 340.

Each of the coupling grooves 350 may include a locking loop 351. In addition, each coupling protrusion 360 may include a locking hook 361. The cell frames 300 may be combined with each other such that the locking hook 361 passes through the locking loop 351 to then be fixed to the coupling groove 350. The locking hook 361 may not be easily released by the locking loop 351. Accordingly, coupling forces between the cell frames 300 can be increased.

The fixing parts 370 may extend from the second ends of the first, second, third and fourth surfaces 310, 320, 330, and 340 in a substantially vertical direction. Here, the fixing parts 370 may be parallel with the first and second long side surfaces 100c and 100d of the battery cells 100. In addition, the fixing parts 370 may be formed to cover some portions of the long side surfaces of the battery cells 100.

While the fixing parts 214, 224, 234, and 244 of the previous embodiment may be formed to extend from only central portions of the second sides of the first, second, third and fourth surfaces 210, 220, 230, and 240 of the cell frames 200, the fixing parts 370 of the present embodiment may be formed to extend from the entire second sides of the first, second, third and fourth surfaces 310, 320, 330, and 340 of the cell frames 300. Therefore, the overall manufacturing process of the cell frames 300 may be simplified, and the battery cells 100 may be fixed in the cell frames 300 in a more secure manner.

The fixing parts 370 may be disposed between the battery cells 100. Accordingly, the battery cells 100 may be spaced a predetermined distance apart from each other, thereby securing swelling spaces. In addition, widths of the cell frames 300 may be slightly greater than widths of the battery cells 100, so that first sides of the cell frames 300 protrude more than first sides of the battery cells 100. Therefore, even if the cell frames 300 are combined with each other such that the regions where the fixing parts 370 are not formed are positioned to be adjacent to each other, the battery cells 100 may be positioned to be spaced apart from each other, thereby securing swelling spaces.

The air holes 380 may be formed by cutting the first and second sides of the third and fourth surfaces 330 and 340, thereby exposing some portions of the short side surfaces of the battery cells 100. Spaces between the battery cells 100 may be exposed by the air holes 380. Therefore, heat generated during use of the battery pack may be discharged to the outside through the air holes 380. In addition, external air may be induced to portions between the battery cells 100 through the air holes 380, thereby cooling the battery cells 100.

By way of summation and review, Embodiments provide a battery pack that may protect battery cells and can secure a swelling space between battery cells by employing individual cell frames for the respective battery cells. That is, the battery pack may employ individual cell frames for battery cells, thereby protecting battery cells and securing a swelling space between the battery cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:
1. A battery pack, comprising:
 a plurality of battery cells, each battery cell of the plurality of battery cells including a top surface from which a pair of electrode tabs are drawn, a bottom surface facing the top surface, a pair of long side surfaces, and a pair of short side surfaces among surfaces connecting the top surface and the bottom surface, each long side surface of the pair of long side surfaces having a larger area than each short side surface of the pair of short side surfaces; and a plurality of cell frames, each cell frame of the plurality of cell frames individually accommodating a respective one of the plurality of battery cells and exposing at least portions of the pair of long side surfaces of the respective one of the battery cells, wherein:

the plurality of cell frames are coupled to each other in a line such that the plurality of battery cells respectively accommodated in the plurality of cell frames are aligned such that one of the pair of long side surfaces of each battery cell of the plurality battery cells faces one of the pair of long side surfaces of an adjacent one of the plurality of battery cells, each cell frame of the plurality of cell frames has edges, the edges of each cell frame of the plurality of cell frames include one or more fixing parts extending parallel with the pair of long side surfaces of the battery cells and covering portions of the pair of long side surfaces, one surface of each cell frame of the plurality of cell frames includes:
- a first end of the one surface and a second end of the one surface;
- a first coupling groove of the one surface, the first coupling groove being in a form of a cut from the first end of the one surface,
- a coupling protrusion of the one surface, the coupling protrusion protruding from the second end of the one surface, the coupling protrusion being positioned at a same height as the first coupling groove, and
- a second coupling groove of the one surface, the second coupling groove being in a form of a cut from the second end of the one surface, the second coupling groove being positioned under the coupling protrusion, and another surface facing the one surface of each cell frame of the plurality of cell frames includes a first end of the another surface and a second end of the another surface, the another surface including:
- a first coupling groove of the another surface, the first coupling groove being in a form of a cut from the second end of the another surface,
- a coupling protrusion of the another surface, the coupling protrusion protruding from the second end of the another surface, the coupling protrusion of the another surface being positioned under the first coupling groove of the another surface, and
- a second coupling groove of the another surface, the second coupling groove being in a form of a cut from the first end of the another surface, and the second coupling groove being positioned at a same height as the coupling protrusion.

2. The battery pack as claimed in claim 1, wherein the one or more fixing parts extend from portions of the edges of each cell frame of the plurality of cell frames.

3. The battery pack as claimed in claim 1, wherein the one or more fixing parts extend along an entirety of the edges of each cell frame of the plurality of cell frames.

4. The battery pack as claimed in claim 1, wherein:
cell frames of the plurality of cell frames have first sides and second sides, long side surfaces of the pair of long side surfaces of the plurality of battery cells that face first sides of the plurality of cell frames are wholly exposed by the plurality of cell frames, and
long side surfaces of the pair of long side surfaces of the plurality of battery cells that face second sides of the cell frames are partially exposed and are partially covered by the fixing parts.

5. The battery pack as claimed in claim 1, wherein the fixing parts are located between each of the plurality of battery cells, the fixing parts separating the battery cells from each other.

6. The battery pack as claimed in claim 1, wherein a width of each of surfaces of each cell frame of the plurality of cell frames is greater than a width of each of the short side surfaces of the pair of short side surfaces of each battery cell.

7. The battery pack as claimed in claim 1, wherein each cell frame of the plurality of cell frames further includes one or more air holes in a form of a partial cut in an edge of the cell frame of the plurality of cell frames, the air holes exposing a portion of a respective one of the plurality of battery cells.

8. The battery pack as claimed in claim 1, wherein each cell frame of the plurality of cell frames includes one or more coupling grooves and one or more coupling protrusions corresponding to the coupling grooves, the one or more coupling grooves and the one or more coupling protrusions engaging the plurality of cell frames with each other.

9. The battery pack as claimed in claim 1, wherein:
the first coupling groove of the one surface and the coupling protrusion of the one surface of each cell frame of the plurality of cell frames are positioned at a same height as the first coupling groove of the another surface of each cell frame of the plurality of cell frames, and
the second coupling groove of the one surface of each cell frame of the plurality of cell frames is positioned at the same height as the second coupling groove on the another surface of each cell frame of the plurality of cell frames and the coupling protrusion of the another surface of each cell frame.

* * * * *